United States Patent [19]
Davis et al.

[11] Patent Number: 5,088,588
[45] Date of Patent: Feb. 18, 1992

[54] BAKERY UTENSIL STORAGE SYSTEM

[75] Inventors: Bill E. Davis, Irving; Eugene W. Meyers, Allen; Paul Podsiad, Plano, all of Tex.

[73] Assignee: Stewart Systems, Inc., Plano, Tex.

[21] Appl. No.: 403,930

[22] Filed: Sep. 7, 1989

[51] Int. Cl.⁵ .................................................. B65G 1/06
[52] U.S. Cl. .................................. 198/347.3; 198/801
[58] Field of Search ............... 414/331; 198/347, 364, 198/369, 801, 817, 347.2, 347.3

[56] References Cited

U.S. PATENT DOCUMENTS

| | | | |
|---|---|---|---|
| 478,263 | 7/1892 | Moss | 198/801 |
| 1,948,090 | 2/1934 | Alvey | 198/733 |
| 2,144,547 | 1/1939 | Robinson et al. | 198/801 |
| 2,446,890 | 8/1948 | Stadelman | 198/831 |
| 3,094,206 | 6/1963 | Stewart et al. | 198/834 |
| 3,101,851 | 8/1963 | Heide et al. | 414/788.4 |
| 3,211,274 | 10/1965 | Keyes et al. | 198/799 |
| 3,363,744 | 1/1968 | Green et al. | 198/778 |
| 3,367,474 | 2/1968 | Kerr et al. | 198/415 |
| 3,378,131 | 4/1968 | Weber | 198/801 X |
| 3,467,238 | 9/1969 | Fry et al. | 198/369 |
| 3,533,517 | 10/1970 | Heide | 414/790 |
| 3,570,651 | 3/1971 | Lanham et al. | 198/778 |
| 3,653,840 | 4/1972 | Kerr | 198/840 |
| 3,680,493 | 8/1972 | Lanham et al. | 198/797 X |
| 3,770,143 | 11/1973 | Brietbach | 198/347 X |
| 3,905,595 | 9/1975 | Adams et al. | 271/217 |
| 3,921,826 | 11/1975 | Rice et al. | 198/801 X |
| 3,933,254 | 1/1976 | Pulver et al. | 414/788.8 |
| 3,937,335 | 2/1976 | Lanham et al. | 414/788.8 |
| 3,991,888 | 11/1976 | Beckius et al. | 414/795.8 |
| 4,042,124 | 8/1977 | Bowdry et al. | 414/788.2 |
| 4,179,235 | 12/1979 | Lanham et al. | 198/347 X |
| 4,830,170 | 5/1989 | Focke | 198/347 |
| 4,848,558 | 7/1989 | Rechsteiner | 198/369 |

FOREIGN PATENT DOCUMENTS

167117  6/1989  Japan ................................ 198/364

Primary Examiner—David A. Bucci
Attorney, Agent, or Firm—Michael A. O'Neil

[57] ABSTRACT

In an automated commercial baking system, a bakery utensil storage system is provided for automatically receiving baking utensils from a continuous conveyor of the baking system and immediately directing the utensils over a selectively positionable curved conveyor for engagement with a predetermined one of a series of table top conveyors from where they are immediately returned to the baking system or lifted by and stored in elevators associated with the table top conveyors. When needed, the utensils are lowered by the elevators for engagement with the table top conveyors from where they are carried to a selectively positionable curved conveyor for return to the continuous conveyor of the baking system.

13 Claims, 6 Drawing Sheets

BAKERY UTENSIL STORAGE SYSTEM

TECHNICAL FIELD

This invention relates generally to bakery utensil storage systems, and more particularly to a storage system which avoids physical contact between the utensils, such as baking pans and baking pan lids, and facilitates immediate access to stored utensils.

BACKGROUND OF THE INVENTION

In the commercial baking industry, bakery products are baked in pans of various types and sizes, depending upon the product being baked. The pans pass through the baking system beginning with initial placement into the system, followed by movement to the molder, where the dough is shaped and placed into the pan. From the molder the pans pass to the proofer, where the dough is allowed to rise, and then into the oven for baking. From the oven the pans travel to the depanner where the baked goods are removed from the pans. Thereafter the Pans are recirculated through or taken out of the system.

Historically, when the pans are removed from the baking system they are placed into nested stacks through the use of a stacking apparatus such as the type described in U.S. Pat. No. 3,770,143. Pan Pallets and/or conveyors receive the stacked pans from the pan stacker and then move the stacked pans to a storage area. When the Pans are to be placed back into the system, the stacked pans are moved from the storage area to a pan unstacking device which may be of the type shown in U.S. Pat. No. 3,770,143. The pan unstacker places the pans back into the baking system for movement to the molder.

Use of such stacking and unstacking systems has proven to be a slow process, increasing changeover time for removing Pans from and returning them to the baking system. Such procedure requires one or more employees for operation of the stackers and unstackers, and movement and positioning of the pan stacks. Furthermore, the repeated physical contact between the pans can result in frequent bending, damage to surface treatments, and reduced life of the pans. At present, no system exists which is capable of bypassing the stacking step and maintaining stored pans within the baking system.

Certain types of bakery products require the use of pan lids in conjunction with the bakery pans during part or all of the baking process. Again, various types and sizes of lids are employed depending upon the size and type of pan to be used in a particular baking operation. At present no system exists for handling bakery pan lids within the baking system so as to increase efficiency and eliminate the deleterious effects resulting from repeated physical contact between the lids.

SUMMARY OF THE INVENTION

The present invention comprises a bakery utensil system which overcomes the foregoing and other problems long since associated with the prior art. In accordance with the invention, pans and/or lids are received directly from the baking system; directed back into the baking system, or lifted and stored in a horizontal suspended position without nesting or physical contact therebetween; and maintained ready for immediate introduction into the baking system, thereby reducing the time required to remove the utensils from and reintroduce them into the baking system.

More specifically, the invention comprises a series of elevators which are associated with and extend above a series of tabletop conveyors for receiving pans or lids from the baking system and delivering them to the elevators. The elevators receive the utensils and lift them from or lower them to the conveyor for receipt back into the baking system.

The apparatus typically comprises a series of rows of interconnected elevators which are accessible by movable curves in an input and output system so that each aligned row of elevators may be accessed for input of utensils into or receipt from the storage apparatus. Activation of the storage apparatus is computer controlled, thus reducing the manpower and time required for introducing the utensils into the baking system. Straps attached to the pans for nested stacking are not required for pan storage in the present invention, thereby reducing the cost of the baking pans by omitting the pan straps. Lids, used with the baking pans, may also be stored in the present invention, thereby reducing manpower and time required for placing the lids into the baking system and increasing lid life by reducing physical contact between the stored lids. Other advantages deriving from the use of the invention will readily suggest themselves to those skilled in the art.

BRIEF DESCRIPTION OF THE DRAWINGS

For a more complete understanding of the present invention and the advantages thereof, reference is now made to the following Detailed Description taken in conjunction with the accompanying Drawings in which.

DETAILED DESCRIPTION

Figures 1, 2:
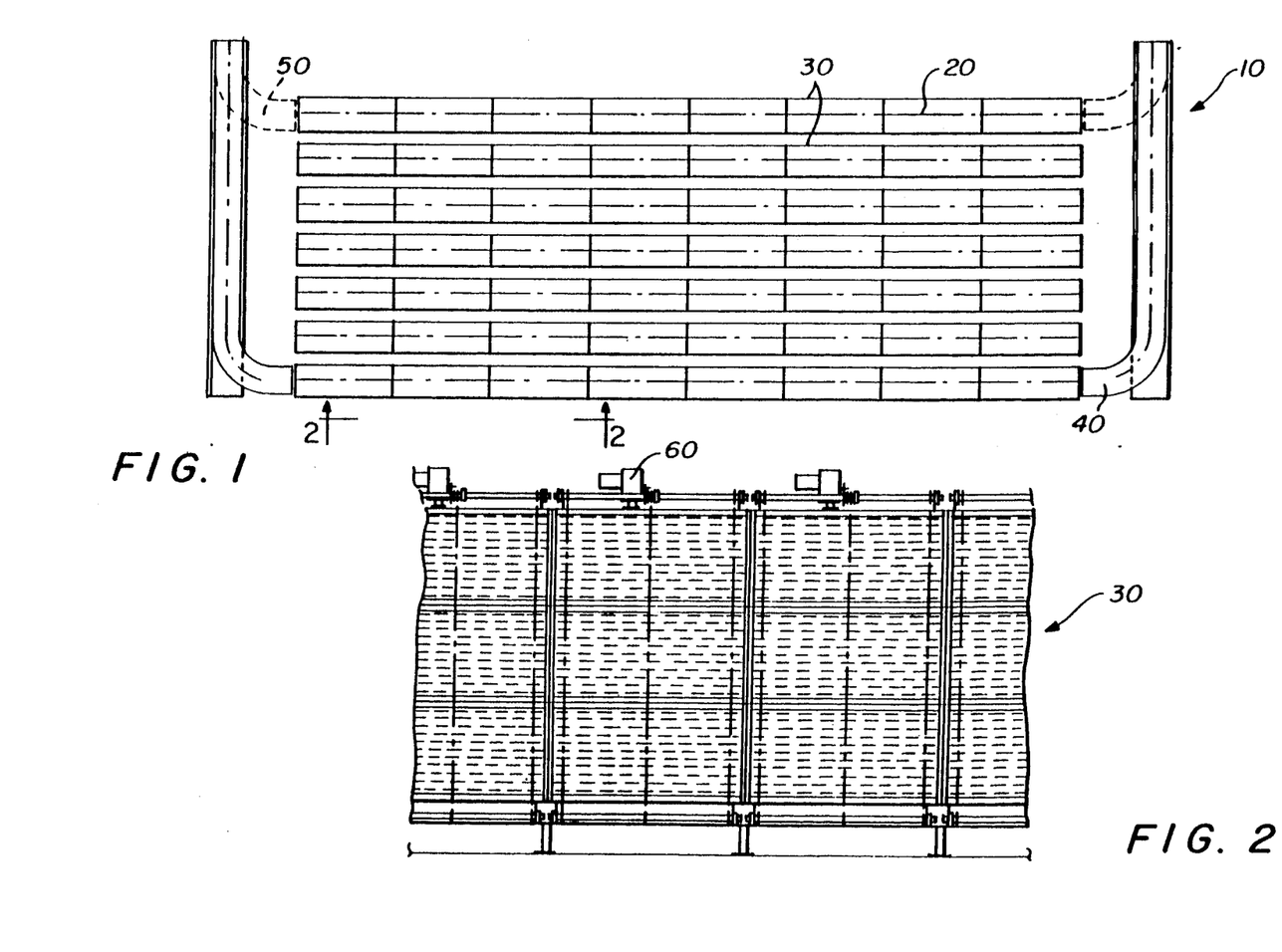
FIG. 1 is a top view of a bakery utensil storage apparatus wherein the movement of the traveling curves is shown in phantom.
FIG. 2 is a side view of interconnected elevators which comprise the bakery utensil storage apparatus.

Now referring to the drawings, and particularly to FIGS. 1 and 2 thereof, there is shown a storage apparatus 10 for automatically receiving and storing empty baking utensils, such as pans and lids, from a commercial baking system. The storage apparatus 10 includes a multiplicity of rows of continuous table top conveyors 20 for receiving empty baking utensils from the baking system, moving them through the storage apparatus 10, and returning them to the baking system. In the preferred embodiment of the storage apparatus 10, a plurality of elevators 30 are associated with each table top conveyor 20 for engaging, lifting, and storing the empty baking utensils after they are received from the baking system by the table top conveyors 20. The empty baking utensils are directed to a preselected table top conveyor 20 by a traveling curve conveyor 40 and are received from a preselected table top conveyor 20 and directed back into the baking system by an opposite traveling curve conveyor 50.

Referring particularly to FIG. 2, as the empty baking utensils are moved over the table top conveyor 20 into position under the elevators 30, a drive mechanism 60 activates the elevators 30 to engage and lift the empty baking utensils for storage in the apparatus 10.

Figure 3:
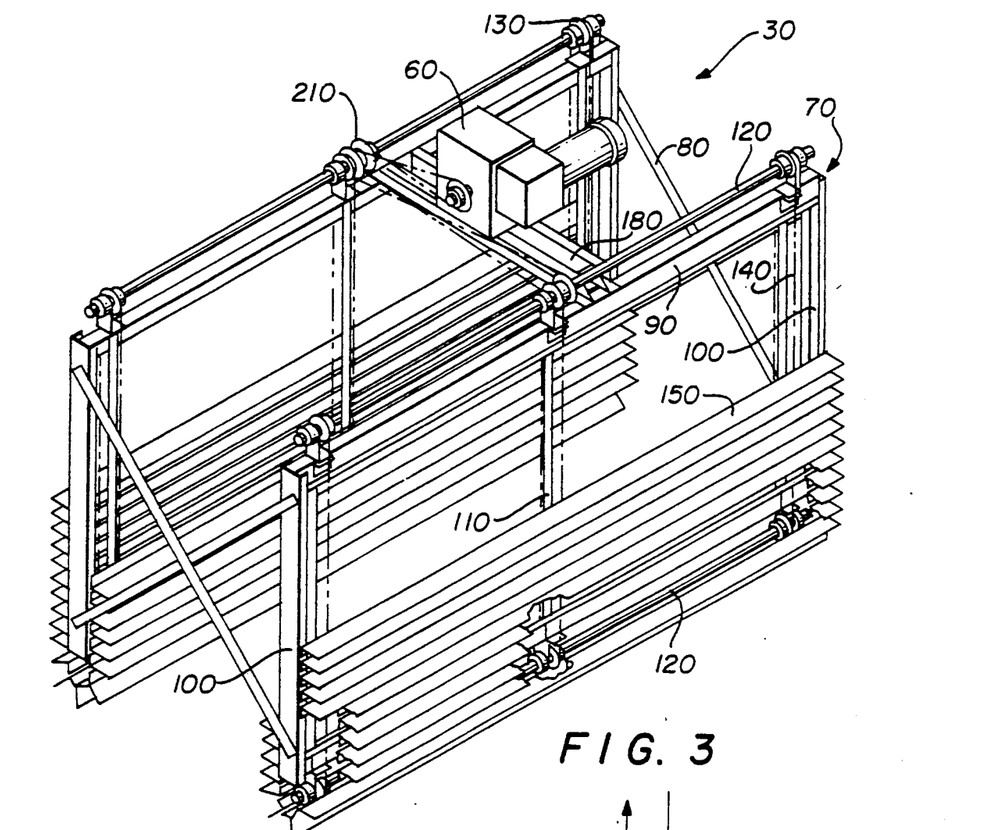
FIG. 3 is a side view of one of the elevators of FIG. 2.
Figures 6, 7:
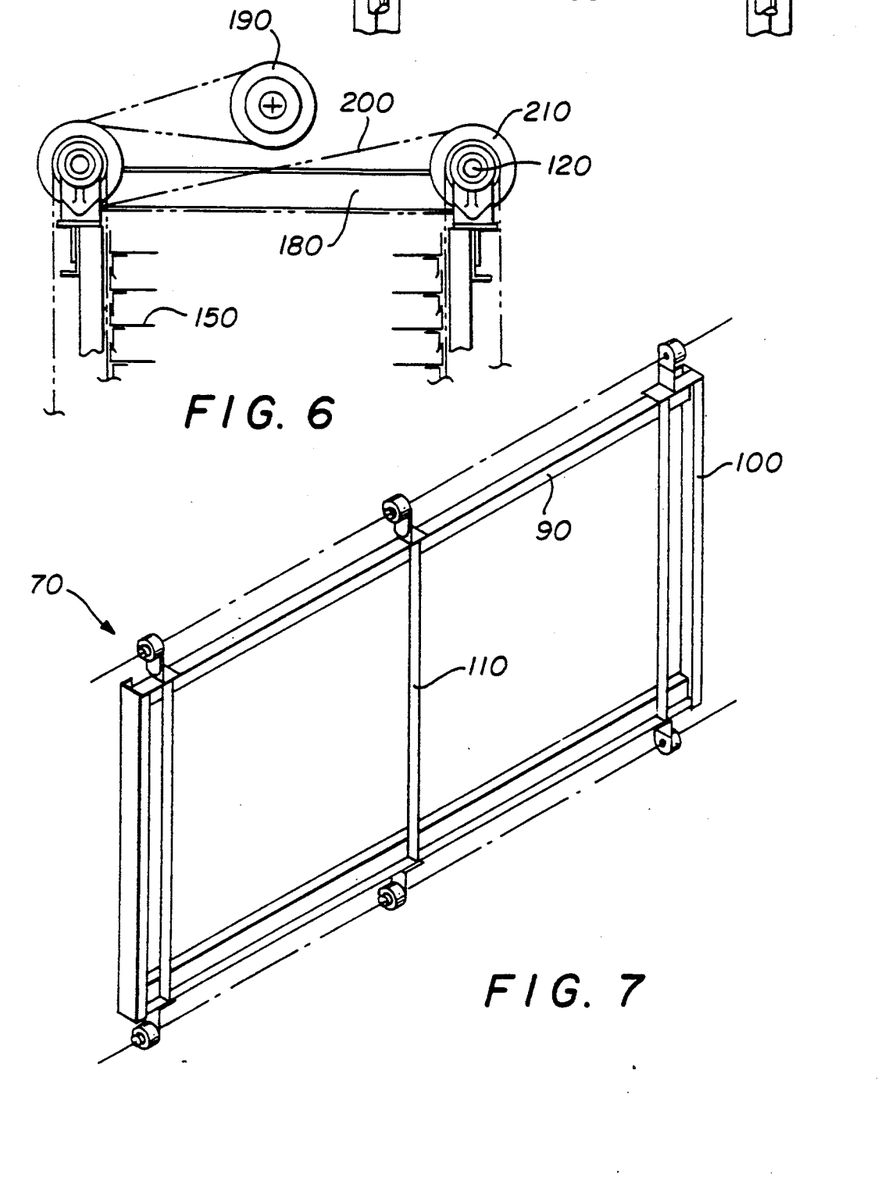
FIG. 6 is a partial side view of the drive assembly for the elevators.
FIG. 7 is an illustration of the frame which supports the elevators.

Referring particularly to FIGS. 3 and 7, each elevator 30 is supported by a frame 70 having opposed sides attached to and stabilized at both ends by a pair of cross members 80. Each opposed side of the frame 70 comprises two parallel opposed longitudinal members 90 attached at each end to parallel opposed vertical members 100, with a plurality of evenly spaced vertical support members 110 attached at each end to the longitudinal members 90. Mounted to the top and bottom of both sides of the frame 70 are longitudinally extending shafts 120 having a plurality of evenly spaced sprockets 130 mounted thereon.

Figure 4:
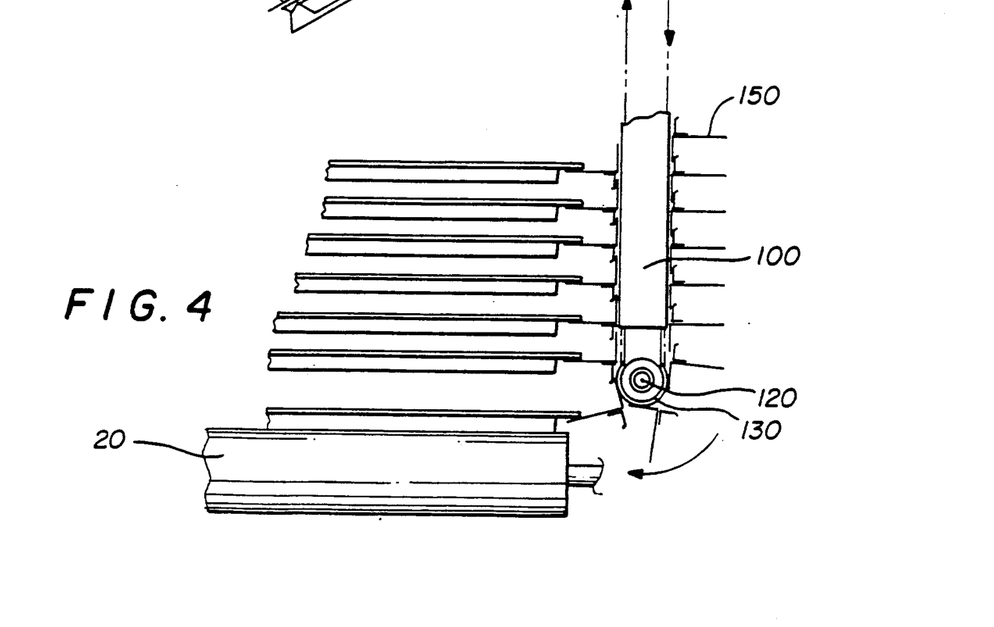
FIG. 4 is an illustration of the drive shafts used in the elevator of FIGS. 2 and 3.

As is best shown in FIGS. 3 and 4, a chain assembly 140 is constrained over the push sprocket 130 for vertical rotation over the opposed sides of the frame 70 of the elevator 30. A multiplicity of longitudinally extending parallel flites 150 are mounted to the chain assemblies 140, such that rotation of the chain assemblies 140 raises the flites 150 for engaging and lifting the baking utensils or an entire array, and when rotated in the opposite direction, lowering and releasing the baking utensils or an entire array back onto the table top conveyor 20.

Figure 8:
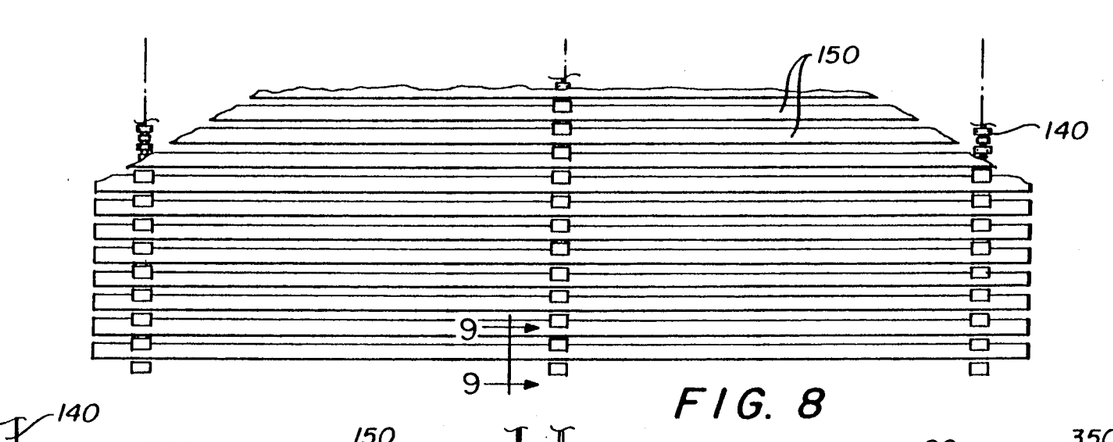
FIG. 8 is a side view of the chain assembly and attached elevator flites used in the elevators.
Figure 9:
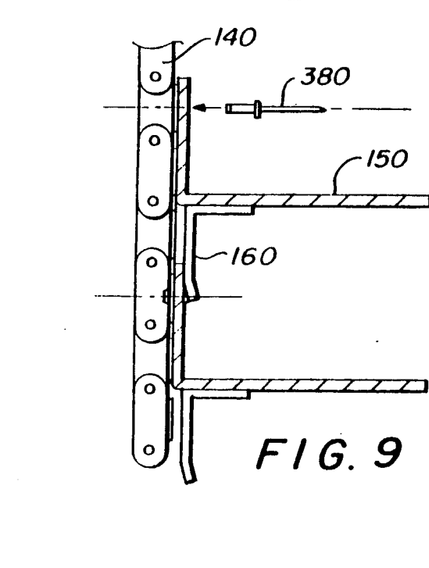
FIG. 9 is an enlarged cutout view of FIG. 8 showing the attachment of the elevator flites to the chain assembly.
Figure 10:
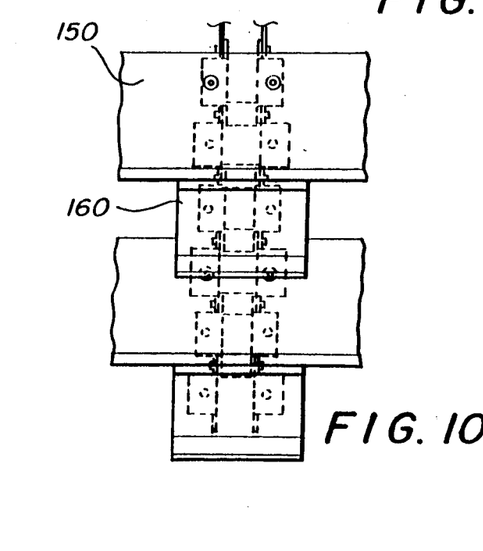
FIG. 10 is an enlarged side view similar to FIG. 8 showing the attachment of the elevator flites to the chain assembly.

Referring particularly to FIGS. 8, 9 and 10, the flites 150 are supported by weight bearing brackets 160 and mounted to the chain assemblies 140 with rivets 380 such that the downwardly extending trailing edge of the weight bearing bracket 160 terminates at a point adjacent to the midpoint of the connecting links of the chain assemblies 140, thereby placing the weight of the flites 150 and suspended baking utensils on the strongest points of the chain assemblies 140, reducing wear and increasing the life of the chain assemblies 140. The placement of the weight of the utensils on the weight bearing brackets 160 applies pressure to the next lower flites 150, stabilizing the lower flites 150.

Figure 5:
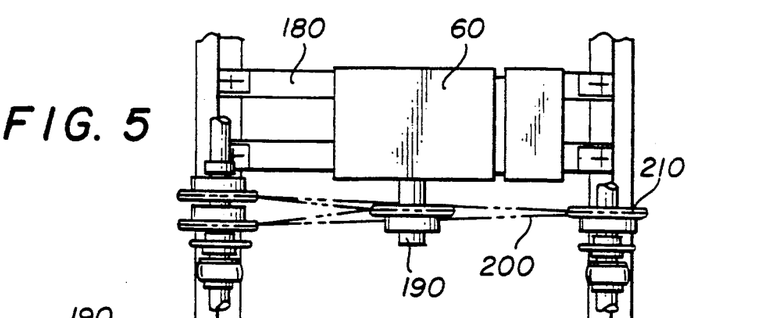
FIG. 5 is a top view of the drive mechanism for the elevators.

Referring again to FIGS. 2 and 3, a drive mechanism 60 for activating the elevator 30, is mounted on a cross member 180 which is in turn mounted on the longitudinally extending support member 90 of the frame 70. As illustrated in FIGS. 5 and 6, the drive mechanism 60 rotates a drive sprocket 190 which engages a drive chain 200, thereby rotating sprockets 210 mounted on the shafts 120, activating rotation of the chain assemblies 140 over the sprockets 130 which are evenly spaced and mounted on the shafts 120 of the elevator 30. Thus, activation of the drive mechanism 60 rotates the shafts 120 to raise or lower the flites 150 mounted on the chain assemblies 140, allowing the empty baking utensils to be engaged and lifted for storage in the storage apparatus 10. The stored utensils are available for immediate access and placement back into the baking system by activating the drive mechanism 60 to rotate the shafts 120 in the opposite direction, thereby lowering the flites 150 mounted to the chain assemblies 140, lowering the utensils into engagement with the table top conveyor 20, which returns the utensils back into the baking system. This avoids damage to the utensils by reducing physical contact between the utensils, reduces the time required for removing utensils from and thereafter returning the utensils to the baking system, eliminates manpower required to position and store nested stacks of empty utensils.

Referring again to FIG. 2, an important characteristic of the elevators 30 comprises the fact that the frames 70 can be interconnected for attachment of elevators 30 both horizontally to create longer rows and vertically to increase capacity of the storage apparatus. When the elevators 30 are stacked, the chain assemblies 140 are spliced to create one continuous chain assembly 140 which rotates vertically the height of the interconnected stacked frames 70 and is driven by the drive mechanism 60 mounted on the top of the frame 70 of the uppermost stacked elevator 30.

Figure 11:
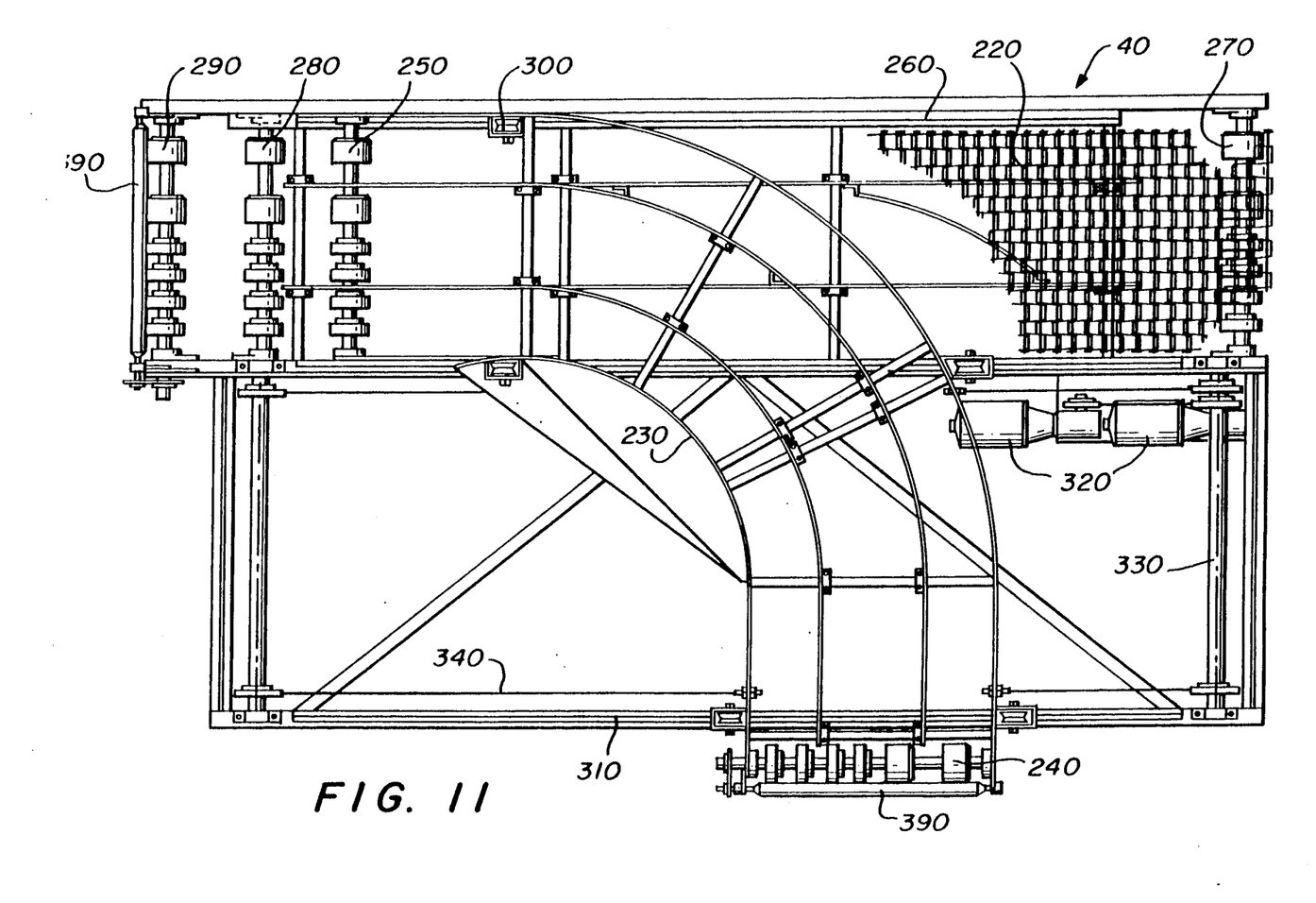
FIG. 11 is an enlarged top view of the traveling curve shown in FIG. 1 and showing the track assembly over which the traveling curve moves and the path of the continuous flexible chain conveyor belt.

Referring particularly to FIGS. 1 and 11, the empty utensils are received from the baking system and directed to a preselected table top conveyor 20 in any one of the rows of elevators 30 by a traveling curve conveyor 40, comprising a continuous flexible chain conveyor belt 220, preferably of the type manufactured by Ashworth Bros., Inc. and sold by that company under the registered mark OMNIFLEX. The continuous conveyor belt 220 travels over the curved frame 230, passing over the set of end rollers 240 rotatably mounted on the distal end of the curved frame 230, passing under the curved frame 230 to return up and over the roller set 250 mounted at the end of the straight frame 260, of the traveling curve conveyor 40, from which end the baking utensils are received from the baking system. The flexible chain conveyor belt 220 continues its path over the straight frame 260 where it passes over the roller set 270 located at the distal end of the straight frame 260, and from there travels under the roller set 280 which prevents contact with that portion of the belt 220 traveling between rollers 240 and 250. The belt 220 continues its path under the straight frame 260 to travel over roller set 290, thereby returning to the top surface of the curved frame 230 of the traveling curve conveyor 40. The curved frame 230 has wheels 300 rotatably mounted on opposed sides of both ends of the curved frame 230 and one wheel rotatably mounted at the apex of the curved frame 230 for support and lateral movement over the straight frame 260 and track assembly 310 of the traveling curve conveyor 40. Transfer rollers 390 are rotatably mounted to the distal end of the curved frame 230 and the end of the straight frame 260 over which the utensils are received by traveling curve conveyor 40 from the baking system or returned by traveling curve conveyor 50 to the baking system to facilitate stable transfer of the utensils to and from the traveling curve conveyors 40 and 50.

Power for activating movement of the curved frame 230 is supplied by a power means 320. The power means 320 provides an output which drives the drive shaft 330 to engage the drive chain 340, thereby moving the curved frame 230 laterally over the straight frame 260 and track assembly 310 of the traveling curve conveyor 40, positioning the distal end of the curved frame 230 adjacent to the preselected table top conveyor 20 of the storage apparatus 10. Thus the baking utensils travel over the curved conveyor 40 to the preselected table top conveyor 20 where the utensils are lifted by the elevators 30 for storage or allowed to continue along the table top conveyors 20 to be returned to the baking system.

Figure 12:
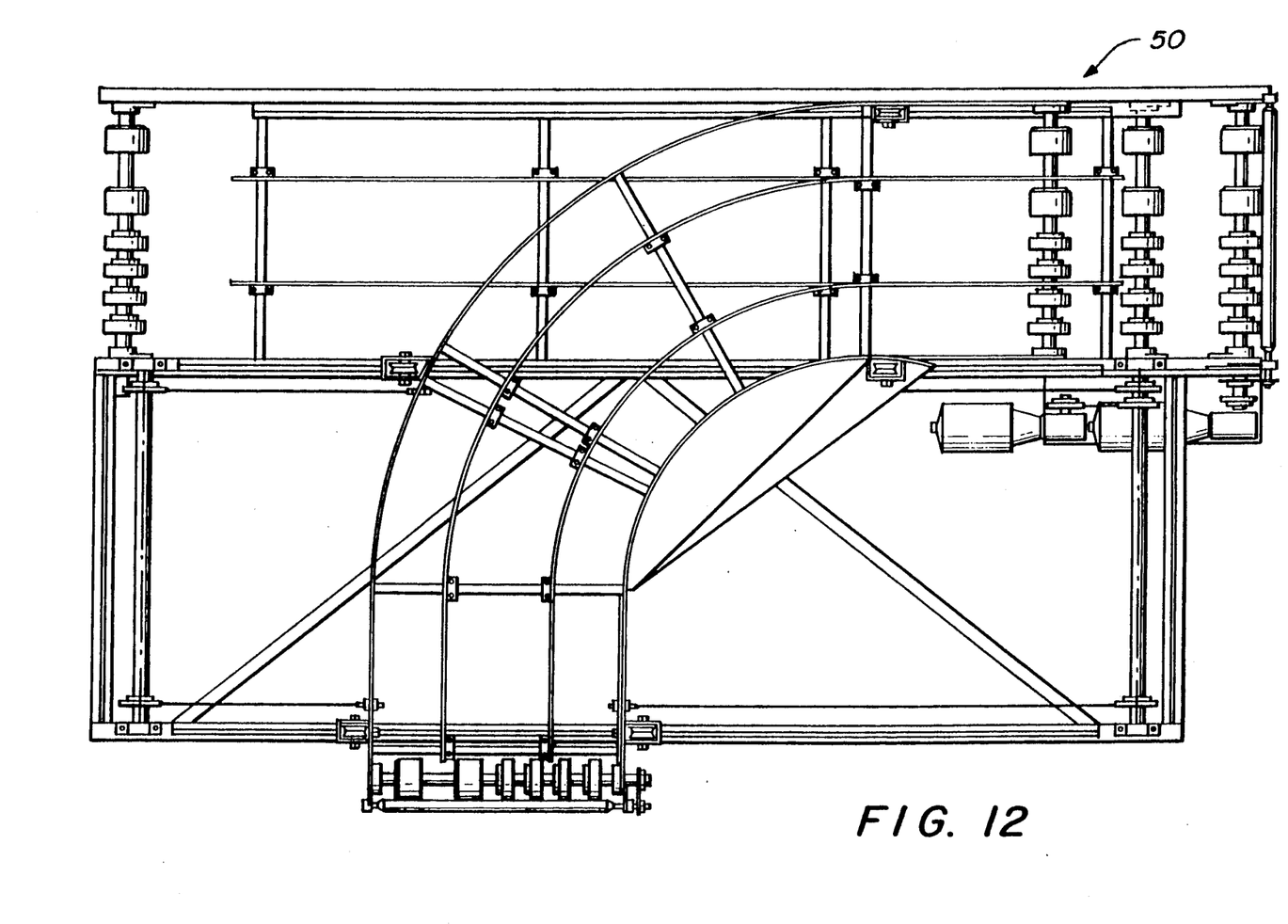
FIG. 12 is an enlarged top view of the opposite traveling curve shown in FIG. 1 and showing the track assembly over which the traveling curve moves and the path of movement of the continuous flexible chain conveyor belt.

Referring to FIGS. 1 and 12, in the preferred embodiment of the storage apparatus 10, the baking utensils are received from the storage apparatus 10 and returned to the baking system over a selectively positionable traveling curve conveyor 50 having a curved frame 230 curved in the opposite direction of the curved frame 230 of the traveling curve conveyor 40 which receives utensils from the baking system and directs them to the preselected table top conveyors 20 of the storage apparatus 10.

Figure 13:
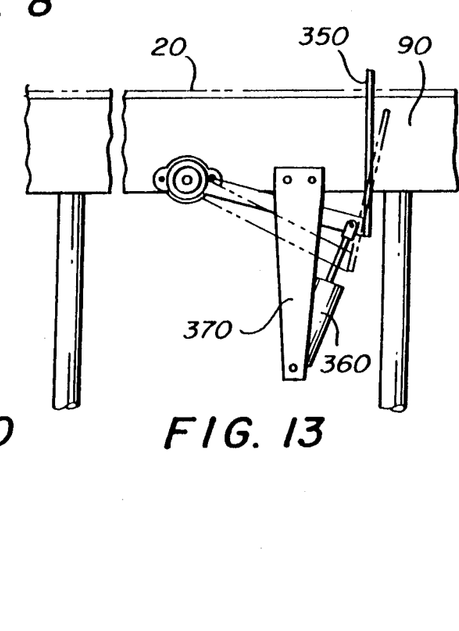
FIG. 13 is an enlarged view of a stop mechanism attached to the lower frame of the storage apparatus.

Referring to FIG. 13, a multiplicity of stop mechanisms 350 are pivotally mounted to the longitudinal support member 90 located at the bottom of the frame 70, and are raised and lowered by activating a power means 360, preferably a pneumatic cylinder, pivotally mounted on a support arm 370 fixedly mounted to the longitudinal support member 90 located at the bottom of the frame 70. Activation of the power means 360 raises the stop mechanism 350, thereby halting movement of the baking utensils over the table top conveyors 20.

In the commercial baking industry, bakery products are prepared in baking pans of various sizes. In a fully automated baking system utilizing the storage apparatus 10, after the bakery goods have been removed from the pans, the empty baking pans are directed by the traveling curve conveyor 40 onto any one of the parallel table top conveyors 20. If the pan is of the size required for the bakery products being prepared at that time, the pans pass along the table top conveyor 20 and are received at the opposite end by the traveling curve conveyor 50, selectively positioned adjacent to the table top conveyor 20. Thus, the pans are immediately returned to the baking system without having ever been stored.

Where, however, the pans being directed into the storage apparatus 10 are of a size different from the one required for preparation of the bakery product presently being prepared in the baking system, the pans are directed over the selectively positioned traveling curve conveyor 40 onto a predetermined table top conveyor 20. The elevators 30 are then activated to rotate the chain assemblies 140, thereby raising the flites 150 to engage and lift the Pans from the table top conveyors 20. The pans are then stored in suspended position until such time as the particular bakery product for which that size pan is utilized is being processed in the taking system. At that time, the elevators 30 are activated, rotating the chain assemblies 140 in the opposite direction, and thereby lowering the flites 150 to engage the baking pans with the table top conveyor 20. The table top conveyors 20 then move the pans onto the traveling curve conveyor 50, which has been selectively positioned adjacent to the table top conveyor 20, thereby returning the pans to the baking system.

Baking pan lids, as well as baking pans, may be stored in the identical embodiment of the storage apparatus 10. The lids are received from the baking system and directed by the traveling curve conveyor 40 to the preselected table top conveyor 20. The elevators 30 are activated to raise the flites 150 to engage the lids and lift them from the associated table top conveyor 20. To return the lids to the baking system, the elevators 30 are activated to rotate the chain assemblies 140 in the opposite direction, thereby lowering the flites 150 to engage the lids with the associated table top conveyor 20. From there the lids travel over the table top conveyor 20 to the traveling curve conveyor 50 to be directed back into the baking system.

In the preferred embodiment of the storage apparatus 10, wherein there are multiple parallel rows of table top conveyors 20 associated with a plurality of interconnected elevators 30, pans and lids of varying sizes may be stored on each row of the storage apparatus 10 by selectively activating the flites 150 and chain assemblies 140 of separate segments of the elevators 30. Similarly, the elevators 30 extending above the table top conveyor 20 of a particular row of the storage apparatus 10 may be selectively activated to engage and lift only certain pans or lids, leaving the remaining pans or lids on the table top conveyor 20 to be returned to the baking system. Therefore, pans and lids of all sizes may be automatically stored within the baking system for subsequent immediate access.

Although the invention has been described in detail, it is to be clearly understood that same is by way of illustration and example only and is not to be taken by way of limitation, the spirit and scope of the invention being limited only to the terms of the appended claims.

We claim:

1. In an automated commercial baking system, an apparatus for automatically receiving, storing and discharging individual baking utensils without need for a stacker or unstacker, the individual utensils moving through the baking system over a continuous conveyor, comprising:

at least one table top conveyor for receiving a horizontally disposed, longitudinally spaced array comprising a predetermined number of individual baking utensils from the continuous conveyor and for discharging said array of utensils onto the continuous conveyor;

means for selectively directing the array of utensils from the continuous conveyor to the table top conveyor;

an elevator associated with the table top conveyor for simultaneously lifting the entire array of utensils from the table top conveyor and thereafter lowering the entire array of utensils onto the table top conveyor;

means for selectively actuating the elevator to lift and remove the array of utensils from the table top conveyor and thereafter lowering the array of utensils to engage with the table top conveyor for return to the baking system; and means for receiving the array of utensils from the table top conveyor for discharge onto the continuous conveyor for return to the baking system.

2. The storage apparatus as described in claim 1 wherein said elevator comprises:

a plurality of opposed pairs of parallel, continuous lift chain assemblies for vertical rotation;

a frame for supporting said lift chain assemblies;

a plurality of evenly spaced, longitudinally extending, parallel flites mounted to said lift chain assemblies; and drive means mounted to said frame for activating rotation of the lift chain assemblies to raise and lower the flights for engaging and lifting and thereafter lowering and disengaging opposed sides of the array of baking utensils.

3. The storage apparatus as described in claim 2, wherein said flites further comprise lift edges supported by weight bearing brackets having a trailing edge and mounted to said chain assemblies with said trailing edge of said weight bearing brackets terminating at a midpoint of connecting links of said chain assemblies.

4. The storage apparatus as described in claim 1, further comprising means for halting movement of the array of utensils over said table top conveyor.

5. The bakery utensil storage apparatus as described in claim 1, wherein said table top conveyor further comprises a continuous belt conveyor.

6. The bakery utensil storage apparatus as described in claim 1, wherein said means for selectively directing the array of utensils to the table top conveyor and the means for receiving the array of utensils from the table top conveyor for discharge onto the continuous conveyor comprise first and second curved conveyors positioned at opposite ends of the table top conveyors, each curved conveyor being selectively positionable adjacent to the table top conveyor for diverting the array of utensils from the continuous conveyor over the first curved conveyor to the table top conveyor and for receiving the array of utensils from the table top conveyor over the second curved conveyor for discharging the array of utensils onto the continuous conveyor.

7. The storage as described in claim 6, further comprising means for moving and positioning the curved conveyors adjacent to the table top conveyor.

8. In an automated commercial baking system wherein individual baking utensils move through the baking system over a continuous conveyor, an apparatus for receiving a horizontally disposed, longitudinally spaced array comprising a predetermined number of baling utensils from the baking system and for either moving the array of utensils immediately back into the baking system or storing the array of utensils for subsequent access without need for use of a stacker or unstacker, comprising:

a plurality of table top conveyors for receiving the array of utensils from and returning the array of utensils to the continuous conveyor of the baking system, each table top conveyor comprising a continuous belt conveyor;

means for selectively directing the array of utensils from the continuous conveyor of the baking system to a predetermined one of the table top conveyors;

an elevator associated with each table top conveyor for lifting the entire array of utensils simultaneously from and thereafter lowering the entire array of utensils simultaneously onto the associated table top conveyor;

means for selectively activating each elevator to lift and remove the entire array of utensils from the table top conveyor for storage and thereafter lowering the entire array of utensils to engage with the table top conveyor for return to the baking system over the continuous conveyor; and means for receiving the entire array of utensils from each table top conveyor for return to the baking system.

9. The bakery utensil receiving and storing apparatus as described in claim 8 wherein the elevator comprises:

opposed, parallel, continuous lift chain assemblies adapted for vertical rotation;

a frame for supporting the lift chain assemblies;

a plurality of evenly spaced, longitudinally extending, parallel flites mounted to said lift chain assemblies; and drive means mounted to said frame for actuating the lift chain assemblies to raise and lower the flites for engaging and lifting and thereafter lowering and disengaging opposed sides of the bakery utensils.

10. The bakery utensil receiving and storing apparatus as described in claim 9 wherein said flites are supported by weight bearing brackets having a trailing edge and mounted to said chain assemblies with said trailing edge of said weight bearing brackets terminating at a midpoint of connecting links of said chain assemblies.

11. The bakery utensil receiving and storing apparatus as described in claim 8, wherein said means for directing the array utensils to the preselected table top conveyor and the means for receiving the array of utensils from the preselected table top conveyor for discharge onto the continuous conveyor comprise first and second curved conveyors with the first curved conveyor positioned at one end of the table top conveyors and the second curved conveyor positioned at the opposite end of the table top conveyors, each curved conveyor being selectively positionable adjacent to a preselected one of the table top conveyors for diverting the array of utensils from the continuous conveyor over the first curved conveyor onto the preselected table top conveyor and for receiving the array of utensils for the preselected table top conveyor over the second curved conveyor and discharging the array of utensils onto the continuous conveyor.

12. The bakery utensil receiving and storage apparatus as described in claim 11, further comprising means for moving and positioning each curved conveyor adjacent to the preselected table top conveyor.

13. The bakery utensil receiving and storing apparatus as described in claim 12, wherein the means for moving and positioning each curved conveyor adjacent to the table top conveyor comprises:

conveyor means for each curved conveyor for moving the bakery utensils;

a fixed frame for each curved conveyor supporting the curved conveyor and over a portion of which the conveyor means travels;

a fixed end of each of said fixed frames from which bakery utensils are received onto the first curved conveyor from the baking system and from which bakery utensils are discharged back over the second curved conveyor onto the continuous conveyor of the baking system;

a curved frame mounted above each fixed frame and over which the conveyor means travels;

means supporting the curved frame of each curved conveyor for lateral movement over the associated fixed frame;

a positionable end of each curved frame angularly offset from the fixed end of the fixed frame, from which positionable end the baking utensils are directed over the first curved conveyor for engagement with the table top conveyors or received over the second curved conveyor from the table top conveyors of the storage apparatus; and power means for actuating movement of the curved frame over the fixed frame for selectively positioning the positionable end of the curved frame adjacent to the prescribed table top conveyor.

* * * * *